UNITED STATES PATENT OFFICE.

J. GALUSHA STAUNTON, OF BUFFALO, NEW YORK.

IMPROVEMENT IN PROCESSES OF PRESERVING ORGANIC SUBSTANCES.

Specification forming part of Letters Patent No. 45,762, dated January 3, 1865; antedated April 3, 1862.

*To all whom it may concern:*

Be it known that I, J. GALUSHA STAUNTON, now of the city of Buffalo and State of New York, have invented a new and Improved Method of Preserving Fruits, Vegetables, and other Articles; and I hereby declare that the following is a full and exact description of such improved method or process.

The nature of my invention relates to making a crust, shell, or covering upon the surface of each fruit, vegetable, or thing to be preserved by means of a substance which is insoluble in water, and which quickly hardens at a given temperature, and which may be rendered plastic and fluid at higher temperatures, such as paraffine.

To enable others skilled in the art to use my invention and practice my improved method, I will describe the same as follows:

I take paraffine and reduce it to a fluid state by heat in a kettle or any vessel suitable for that purpose. I then quickly immerse or dip the fruit or vegetables to be preserved into this fluid paraffine, and immediately as the fruit, &c., are taken from the vessel and exposed to the air the adhering paraffine hardens and forms an air-tight shell, crust, or covering over the entire surface of each article so dipped or immersed, which shell or covering is insoluble in water and impervious to air or moisture, and prevents the escape of any particle of the odor, fragrance, or substance of the fruit. In some cases it may be advisable to subject the fruit to two dippings or immersions in order to insure a thick and perfect shell or crust. In some cases also I apply only sufficient heat to render the paraffine plastic, and then roll it into thin sheets, and then wrap each specimen of fruit, &c., in a thin sheet of paraffine, (like paper,) and the overlapping parts of the sheets will unite and form a perfectly air-tight shell or covering over and upon the surface of each fruit. In some cases, also, when great expedition is desirable, the fruit or vegetables may be put into a box and the fluid paraffine poured onto the fruit and immediately poured off again, except such as adheres to the fruit, forming a conglomerate mass.

When the fruit, &c., are immersed or dipped in the fluid paraffine a wire ladle may be used to advantage; or any other convenient means of dipping or coating the fruit with paraffine may be resorted to, such as may be preferred by the operator.

When the fruits, vegetables, &c., are thus enveloped in a crust or covering of paraffine it is packed in suitable boxes or baskets and put into an ice-house or store-room with a temperature not below 32° nor above 45° Fahrenheit, where it may be kept in a perfect state of preservation for any length of time.

Fruit may be kept in a state of preservation for a much greater length of time in the described shell of paraffine in ordinary temperatures than without such shell or covering; but to insure the perfect preservation for a comparatively long period it is desirable to add the low temperature of the ice-house, as described.

I am aware that wax has been used as well as stearine for excluding air from fruit and other articles, and have found in my own experiments that they may be combined in such proportions as to possess some of the essential qualities of paraffine for that purpose; but the advantages of paraffine are that it is free from taste, color, or smell, is fluid at a comparatively low temperature, and is plastic and ductile when warm and does not crack when cold. It is perfectly harmless when taken into the stomach, and no possible danger can arise from its being eaten with the fruit. It is easily removed from the fruit by peeling or shaving it off or by melting in water at about 130° Fahrenheit. It will rise to the surface of the water when thus melted. It may be repeatedly used for the same purpose without being reduced in quantity or value. It is entirely impenetrable to air, moisture, or odor, and is impervious as against the escape of a particle of the fragrance or substance of the thing covered by it.

It is known to chemists that the conditions necessary to decomposition are moisture, air or oxygen, and heat, and that decomposition is an active process dependent upon one or all of these conditions. The removal of one of these conditions by drying has long been resorted to for preserving fruit. Many efforts have been made which have resulted in the partial withdrawal of air or oxygen by means of airtight cans and the withdrawal of the third condition, or heat, by the use of refrigerators. The objections to the drying process are the long time required and the expense of the process and the loss of the greater part of the flavor and fragrance of the fruit. The air-tight cans are liable to similar objections and the difficulty and uncertainty of the process. The third is objectionable on account of the moisture or dampness attendant on the artificial production of a low temperature, which is fatal to preservation for a long time unless the temperature is reduced below 32° Fahrenheit, which would of course destroy fruit and vegetables.

My improvement above described avoids all of these objections, and is entirely practicable, and fully accomplishes the purposes desired, fulfilling all the conditions essential for preservation.

What I claim as my invention, and desire to secure by Letters Patent, is—

The method of preserving fruits, vegetables, and the like by means of an external crust, shell, or covering of paraffine in contact with the body of the fruit or thing to be preserved, substantially as described.

J. GALUSHA STAUNTON.

Witnesses:
   E. B. FORBUSH,
   H. BOIES.